E. A. UEHLING & A. STEINBART.
PYROMETER.
No. 11,413. Reissued Apr. 17, 1894.
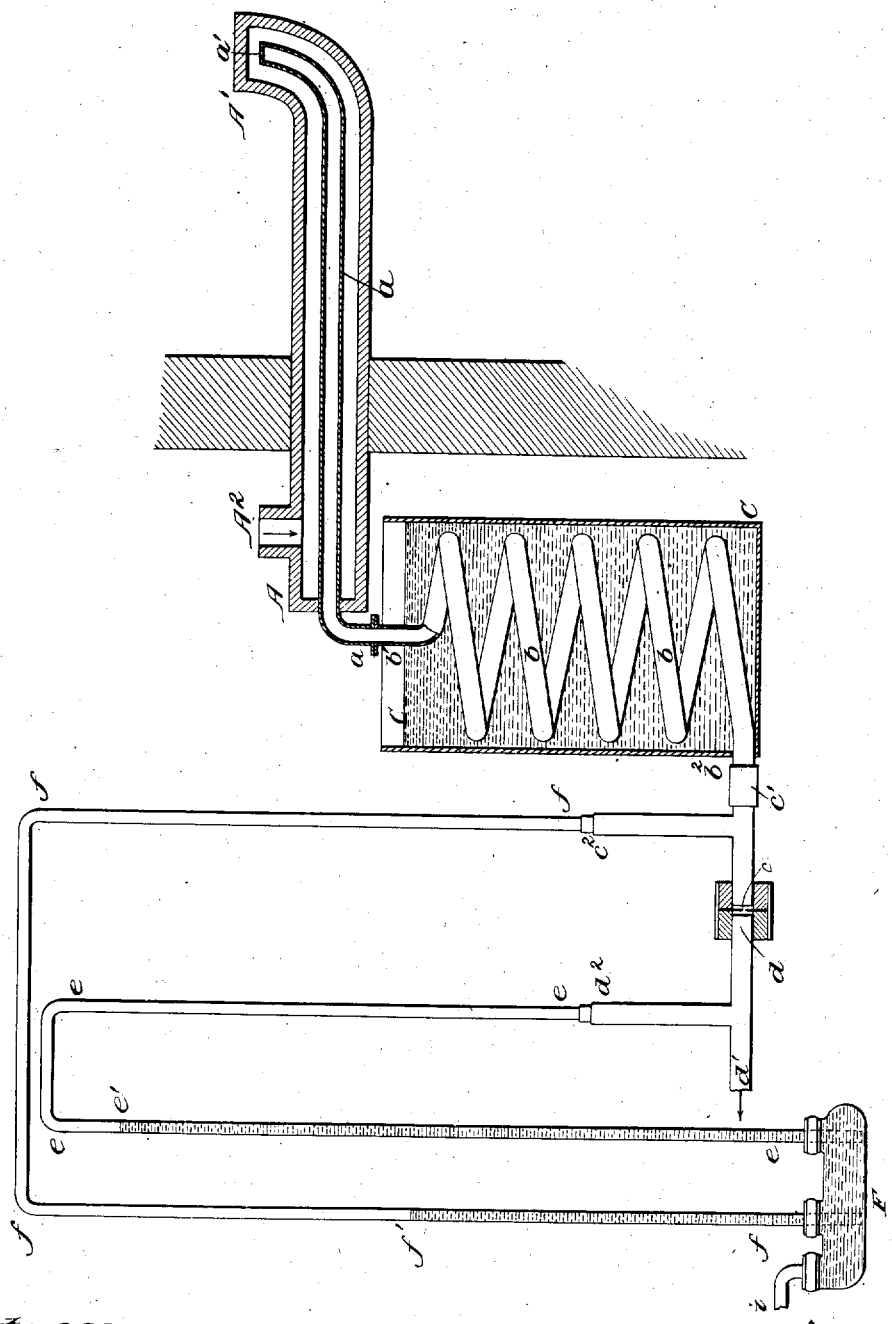
Witnesses
Wm. Lowry
G. M. Copenhaver
Inventors
Edward A. Uehling
Alfred Steinbart
By Johnson & Johnson
Their Attorneys

UNITED STATES PATENT OFFICE.

EDWARD A. UEHLING AND ALFRED STEINBART, OF BIRMINGHAM, ALABAMA.

PYROMETER.

SPECIFICATION forming part of Reissued Letters Patent No. 11,413, dated April 17, 1894.

Original No. 503,337, dated August 15, 1893. Application for reissue filed December 8, 1893. Serial No. 493,134.

*To all whom it may concern:*

Be it known that we, EDWARD A. UEHLING, a citizen of the United States, and ALFRED STEINBART, a subject of the Emperor of Germany, residents of Birmingham, in the county of Jefferson and State of Alabama, have invented certain new and useful Improvements in Pyrometers, of which the following is a specification.

The object of our invention is to produce an instrument for accurately and continuously indicating high temperatures. The principle involved is the law of the passage of gas or air under a constant forced flow through small apertures. In the provision of a device for effecting this object its primary feature is the forcing of air or gas through two successive small apertures, whereby the tension between them will remain constant so long as the temperature of the passing fluid remains equal and constant at both apertures, and whereby a change of temperature at either one or the other of the apertures will also cause a change of tension between them. If therefore, the fluid as it passes through one of these apertures, is made to vary with the temperature to be measured, while at the other it is constantly kept at a certain normal temperature, then the variation of the tension between the apertures will be a measure of the degree of heat the air has at the time of entering into the space or conduit between and connecting the two apertures, and hence of the temperature to be measured. For carrying out this operation and obtaining this result, our invention consists of certain novel parts and combinations of parts which are embodied in the structure illustrated in the accompanying drawings. This structure however, we desire it to be distinctly understood is intended only as an illustration of one form of device embodying our invention which may be embodied in other and different forms.

In the apparatus illustrated in the drawings it will be understood that the end A′ of the tube A, $A^2$, is located in the space, or closure, or connected with the device the temperature of which is to be determined or constantly indicated, such for instance as a hot air blast now universally used in the smelting of iron, or of an annealing furnace. For this purpose the inner end of this tube is closed and is preferably turned up or swelled. The other end of this tube extends outside of the closure and has an opening $A^2$ through which the fluid to be heated enters. Within this tube is placed a tube *a*, so that there will be a free space all around it. That end which terminates within the closed end of the outer tube, has a small opening or aperture *a′*; while its other end which passes through and out of the outer tube, at that end which is outside of the closure the temperature of which is to be determined, connects with a coil or worm *b*, *b′*, which at its other end at $b^2$, connects with the T-couplings *c′*, $c^2$, and *d*, $d^2$, between which at their junction is located a diaphragm or thin plate having an aperture *c* similar to that in the tube at *a′* within the outer heat transmitting pipe. The T couplings are connected respectively by the tubes *f*, *f* and *e*, *e* with the reservoir F which is filled with a suitable liquid and open at *i* to the atmosphere. Both these tubes open into the reservoir and, rising therefrom, the tube *f*, *f* connects with the fluid conducting tube at a point between its minute apertures, and the tube *e*, *e* connects with the fluid conducting tube between the outlet minute aperture and the suction end of said tube, whereby the said column tubes constitute manometers in which the height of the column *e′*, indicates the suction or degree of vacuum applied to the said tube at *d′*, and the height of the column *f′* indicates the tension between the minute apertures, this tension being an accurate measure of the temperature at A′. An index properly graduated can be readily attached to the tube *f*, *f*, on which the degrees of heat can, at any time be read off.

The operation is as follows: A partial vacuum is formed by suction at *d′* in the tube *a*, the tension of which is indicated and constantly kept at a degree shown by the column *e′*. In consequence of this constant suction, atmospheric air enters into the chamber A A′ at $A^2$ and on its way to the aperture *a′*, it attains the temperature to be determined and indicated and enters at that temperature through the minute aperture *a′* into the tube, *a*, thence through the coil *b*, *b*, which is immersed in a liquid kept at a constant temperature, and after attaining this temperature it continues through the coupling $c'$ and the second minute aperture $c$ and escapes at the vacuum connection $d'$. So long as the temperature at A′ is the same as that of the coil $b$, $b'$, the tension between the apertures indicated by the height of the column in $f$, $f$, as at $f'$ will remain constant; but as the temperature at A′ rises, the air entering at $a'$ becomes heated and expands, and hence quantitatively less air can enter through the minute aperture. But because the temperature of the medium surrounding the coil $b$, $b'$ remains constant, the temperature is there brought back to the normal degree, hence the capacity of the flow through the minute aperture $c$ is unchanged, and consequently the tension between the minute apertures approaches that of the suction more and more as the temperature at A′ rises higher and higher and therefore the height of the column in $f$, $f$, is a correct measure of the temperature at A′.

The apparatus can be adapted for use anywhere for the purpose designed and the degree of heat which it will indicate is limited only by the material of which the tubes subjected to the heat are made.

Referring to the indication of the temperature it will be understood that there are no thermometer tubes, nor necessarily any mercurial tubes, in connection with our pyrometer. Our invention requires simply some form of vacuum gage if the pyrometer is operated by suction, or pressure gage if operated by pressure, which may be a mercurial or any other column, or a spring gage, many forms of which are available. It will also be understood that the action of our pyrometer depends upon the law of the flow of gases through small apertures, according to which if air be drawn through two successive apertures by the aid of a common suction, the tension between these apertures will remain constant so long as the temperature of the air remains equal and constant at both apertures, *i.e.* while flowing through. A change of one temperature, however, at either one or the other of the apertures will also cause a change of tension between them. This tension is the measure of the temperature to be determined. To make this an accurate measure of the temperature at $a'$ (which is the same as that of the space surrounding the inclosing tube A A′, which may be filled with air, as in the illustration, or with molten metal, slag, glass or any other substance into which the tube $a$, may be inserted) it is essential that the air in passing through the aperture $c$ should be of a constant temperature and for this reason it is passed through the cooling tube $b$ $b'$, while at $a'$ it varies with the temperature to be measured. Of course it is well known that gases expand by heat and contract in cooling. If the temperature of the air passing in at $a'$ is the same as in passing out at $c$, the tension between the two apertures (shown by the column $f$ $f'$) will be due to the friction in passing through the small holes or apertures. If however, the air at $a'$ is heated its volume will be proportionately increased, and hence less of it can enter through $a'$. If now it be cooled to the normal temperature before it passes out at $c$, a less volume will have to pass through $c$, in consequence of which the partial vacuum (suction) will act more on the space between the two apertures and the column in $f$ $f'$ will rise to show the change of tension and temperature at $a'$.

We claim as our invention—

1. The herein described method of determining temperature, which consists in passing the measuring fluid into a tube or chamber through a minute aperture, subjecting the said fluid to a change of temperature in its passage through the said tube or chamber the fluid having the temperature to be measured in its passage through one of said apertures and a normal temperature in its passage through the other aperture, and utilizing the change in the tension of the measuring fluid between the said apertures as a means to ascertain the degree of the temperature to be indicated.

2. The herein described method of determining temperature which consists in passing a gas through a tube or chamber having two apertures, the gas being raised to the degree of temperature to be indicated prior to entering one of the apertures, then reducing the gas to a normal degree before it flows through the other aperture, the change in tension of the said gas between the said apertures being a measure of the temperature to be determined.

3. The herein described means for determining temperature, consisting of a tube having two apertures, through which the gas is passed under pressure, the gas entering one aperture at the degree of temperature to be determined, and a reducing device to bring the gas to a normal temperature before flowing through the other aperture, the change of tension of the gas between the two apertures being a measure to determine the degree of temperature to be ascertained.

4. The herein described means for determining temperature consisting of a tube having two apertures, through which the gas is passed under pressure, the gas being raised to the degree of temperature to be ascertained before entering one aperture, a reducing device to bring the gas to a normal temperature before flowing through the other aperture and a manometer having connection with the tube to indicate the change in tension between the said two apertures and the degree of temperature to be determined.

5. A pyrometer consisting of a chamber in which a gas is raised to the degree of temperature to be ascertained, a tube having a portion projecting into the said chamber and having two apertures, a reducing device applied to the other portion of said tube to bring the gas to a normal temperature before leaving the tube, a manometer having connection with the said tube to indicate the change in tension of the gas between the said apertures and as it is passed under pressure through said tube substantially as and for the purpose set forth.

6. A pyrometer consisting of a tube having two small apertures and in communication with a partial vacuum at $d'$, the gas being raised to the degree of temperature to be determined before entering one aperture, a cooling device to reduce the temperature of the gas to a normal or certain degree before flowing through the other aperture, and a manometer to indicate the change in tension of the gas between the said apertures, substantially as described.

7. An apparatus to determine temperature consisting of a chamber or tube having minute inlet and outlet apertures and into which chamber or tube gas is passed, a reducing device to bring the gas to a normal temperature at or before its passage through one of said minute apertures, the gas being heated to the temperature to be ascertained before its passage through the other aperture, and the change in the tension of the gas between the minute apertures being utilized, by a suitable indicator, to ascertain the temperature to be determined.

In testimony whereof we have hereunto signed this specification in the presence of witnesses.

EDWARD A. UEHLING.
ALFRED STEINBART.

Witnesses:
J. M. PICKENS,
REUBEN K. EDWARD.